(12) United States Patent
Ophir et al.

(10) Patent No.: US 8,711,757 B2
(45) Date of Patent: Apr. 29, 2014

(54) LOCAL ACCESS TO DATA WHILE ROAMING WITH A MOBILE TELEPHONY DEVICE

(75) Inventors: Shai Ophir, Moshav Ein-Vered (IL); Michael Semama, Revava (IL); Li-On Raviv, Petach Tikva (IL)

(73) Assignee: StarHome GmbH, Zurich (CH)

( * ) Notice: Subject to any disclaimer, the term of this patent is extended or adjusted under 35 U.S.C. 154(b) by 0 days.

(21) Appl. No.: 13/519,594

(22) PCT Filed: Dec. 30, 2010

(86) PCT No.: PCT/IL2010/001096
§ 371 (c)(1),
(2), (4) Date: Jun. 28, 2012

(87) PCT Pub. No.: WO2011/080744
PCT Pub. Date: Jul. 7, 2011

(65) Prior Publication Data
US 2012/0287844 A1 Nov. 15, 2012

Related U.S. Application Data

(60) Provisional application No. 61/291,961, filed on Jan. 4, 2010.

(51) Int. Cl.
*H04B 7/14* (2006.01)
*H04L 12/28* (2006.01)
*H04J 3/24* (2006.01)
*H04W 4/00* (2009.01)
*H04W 74/00* (2009.01)
*H04M 15/00* (2006.01)

(52) U.S. Cl.
USPC ........... 370/315; 370/392; 370/431; 370/475; 370/913; 455/432.1; 455/450; 379/114.01; 379/114.21; 379/114.22; 379/133

(58) Field of Classification Search
USPC ......... 370/229–231, 235, 236, 310, 328, 351, 370/389, 392, 908, 912, 913; 455/403, 455/422.1, 432.1, 433
See application file for complete search history.

(56) References Cited

U.S. PATENT DOCUMENTS

2005/0223113 A1\* 10/2005 Hoffmann ...................... 709/245
2006/0203719 A1\* 9/2006 Kim et al. ...................... 370/227
(Continued)

FOREIGN PATENT DOCUMENTS

WO  WO 2007/104324        9/2007
WO  WO 2007104324 A1 \*   9/2007
(Continued)

OTHER PUBLICATIONS

International Preliminary Report on Patentability Dated Jul. 12, 2012 From the International Bureau of WIPO Re. Application No. PCT/IL2010/001096.
(Continued)

*Primary Examiner* — Omar Ghowrwal

(57) ABSTRACT

Apparatus for local access to data while roaming with a mobile telephony device at a roaming network. The apparatus is located at the roaming network and comprises a filter having a data packet or packet header inspection unit for inspecting packet information or headers to identify data packets addressed from the roaming telephony device for use via a home network data packet gateway, and a packet diverter for diverting at least some of the identified packets to a local data packet gateway; the filter setting up a diversion tunnel for additional packets of the same session for directly routing all packets of the identified session to the local data packet gateway. Mobile devices are today programmed to send data to their home network for browsing via the home network data packet gateway. The filter allows data to be redirected to the roaming network so that Internet browsing and like data uses can be carried out directly by the roaming user at less cost and greater efficiency and quality of service.

22 Claims, 7 Drawing Sheets

(56) References Cited

U.S. PATENT DOCUMENTS

| | | | |
|---|---|---|---|
| 2007/0036312 A1* | 2/2007 | Cai et al. | 379/126 |
| 2007/0104197 A1* | 5/2007 | King | 370/392 |
| 2008/0219224 A1* | 9/2008 | Balaji et al. | 370/338 |
| 2009/0088129 A1* | 4/2009 | Cai et al. | 455/406 |
| 2009/0215447 A1* | 8/2009 | Catalano et al. | 455/432.1 |
| 2010/0097977 A1* | 4/2010 | Rommer et al. | 370/315 |
| 2010/0192202 A1* | 7/2010 | Ker | 726/4 |

FOREIGN PATENT DOCUMENTS

| | | |
|---|---|---|
| WO | WO 2008/060208 | 5/2008 |
| WO | WO 2008/110215 | 9/2008 |

OTHER PUBLICATIONS

International Search Report and the Written Opinion Dated May 24, 2011 From the International Searching Authority Re. Application No. PCT/IL2010/001096.

Cai et al. "Online Charging in the Roaming EPC/LTE Network", Bell Labs Technical Journal, 15(1): 115-132, 2010.

ETSI "Digital Cellular Telecommunications System (Phase 2+); Universal Mobile Telecommunications Sytem (UMTS0; LTE; Policy and Charging Control Architecture (3GPP TS 23.203 Version 8.6.0 Release 8)", ETSI, European Telecommunications Standards Institute, p. 1-115, Jun. 2009.

Communication Pursuant to Article 94(3) EPC Dated 1 Jan. 14, 2014 From the European Patent Office Re. Application No. 10809192.7.

* cited by examiner

LOCAL ACCESS TO DATA WHILE ROAMING WITH A MOBILE TELEPHONY DEVICE

RELATED APPLICATIONS

This application is a National Phase of PCT Patent Application No. PCT/IL2010/001096 having International filing date of Dec. 30, 2010, which claims the benefit of priority of U.S. Provisional Patent Application No. 61/291,961 filed on Jan. 4, 2010. The contents of the above applications are all incorporated herein by reference.

FIELD AND BACKGROUND OF THE INVENTION

The present invention relates to local access to data while roaming with a mobile telephony device and, more particularly, but not exclusively to such access for Internet surfing and like data uses.

Data roaming in GSM and other 3G networks is based on the concept that all data traffic is routed to the home network first, and then to the final destination. The SGSN (Serving GPRS Support Node) network core element in the roaming (visited) network receives the data traffic from the base station/base station controller, performs DNS resolution, and routes the traffic to the home network GGSN (Gateway GPRS Support Node). The GGSN allocates an IP address for the mobile device, and connects the session to the service—the Internet, the so-called walled garden or home portal network, or any other service. The GGSN may also performs charging for the data service, and charging may be either postpaid, via data records, CDRs or OCS—an Online Charging System, or may be prepaid, achieved by interfacing with a prepaid system. Charging can also be triggered by the SGSN at the visited network, using CAMEL triggers sent directly to the home charging system. Such is mainly used for prepaid.

In the fourth generation or 4G LTE/EPC (4G) network, the situation remains basically the same. All roaming data is still to be directed to the home network. In LTE voice is considered data as well, as LTE uses VoIP solutions such as SIP and IMS. However voice originated calls in roaming, that is MO calls, or Mobile originated calls, are not necessarily routed to the home network first. Instead, they may be routed to the destination directly from the roaming network. Such direct routing actually preserves the situation in 2G/3G networks, where MO calls in roaming are also not routed to the home network. Direct routing works by building into LTE networks a configuration known as Local Breakout, where data is identified as voice data, according to the APN (Access Point Name) of the voice application, and following identification is handled solely by the local network. However data not identified as voice data continues to be sent to the home network as before, leading to greater cost, lower efficiency and lower quality of service.

The present inventors consider that the current situation in which data traffic does go to the home network is going to change, as more data traffic is used by roamers.

Home routing of data traffic indeed creates a severe quality of service (QoS) problem for the data traffic, due to the additional distance it passes. In addition, the mobile operator is charged by the international carrier for a GRX service (GPRS exchange routing).

As mentioned, LTE/EPC indicates the fourth generation (4G) of mobile network to evolution. LTE (Long Term Evolution) concentrates on the radio part of the network, while EPC (Evolved Packet Network) refers to the all-IP next generation core network. The network architecture may drastically change while moving to all-IP. The traditional 2G/3G features of MSC/VLR and HLR are expected to disappear, replaced by new network components: MME, Service GW and PDN GW.

The 3GPP LTE roaming standardization uses different architectures respectively for home routing and local breakout. Home routing requires all data traffic to go to the home network first, and then to the destination, as in the case of the legacy GSM and 3G. However since voice calls are data too (except for the CS fallback case), 3GPP preserves the current mode for roaming MO calls (Mobile Originated) calls, so that the MO calls are not routed to the home network first. For this reason, the local breakout mode was defined, where the visited network (VPMN) enables a local exit of voice sessions. The local exit requires the VPMN to distinguish between voice and data sessions, and apply different routing rules, per the specific home network.

Voice calls originating in the roaming network are thus not routed to the home network, unless of course this is the actual destination. Nevertheless, as data, such as packets for Internet browsing, is always given a destination at the home network, such data is necessarily routed to the home network.

The 3GPP standard solution for charging the local breakout scenario is relatively complex. The system requires that the PCEF unit, the Policy and Charging Evaluation Function, at the visited network, which has the home network charging rules loaded, communicates with the home OCS (On-line Charging System) that does the actual charging. For the local breakout scenario, the home OCS may perform real-time charging according to the visited network tariff plans and charges. In LTE networks the tariff plans and policies may dynamically change, and that requires the home network OCS to adapt in real time as well.

Alcatel-Lucent (ALU) identified this problematic situation, and published an article proposing an improved solution. The paper, "*Online Charging in the Roaming LTE/EPC Network*", was published in Bell Labs Technical Journal 15(1), pages 115-132, at 2010. ALU proposes adding a v-OCS, an additional OCS entity at the visited network which serves inbound roamers, and mediates with the home OCS. The v-OCS may be the focal point for local charging, according to the VPMN charging plans, but always in communication with the h-OCS. The ALU solution imposes a new architecture at the VPMN and new interfaces to the home OCS, Ro' and Rc', which are not standardized yet, and even more problematically, which requires modification to the home OCS as well.

SUMMARY OF THE INVENTION

According to one aspect of the present invention there is provided apparatus for local access to data while roaming with a mobile telephony device at a roaming network, the telephony device being associated with a home network separate from the roaming network, the apparatus being located at the roaming network and comprising:

a filter having a data packet inspection unit for inspecting packets to identify data packets addressed from the roaming telephony device for use via a home network data packet gateway, and a packet diverter for diverting at least some of the identified packets to a local data packet gateway;

the filter being further configured to set up a diversion tunnel for additional packets having packet destination information corresponding to the diverted packets, the diversion tunnel being for locally routing the packets having corresponding packet destination address information to the local data packet gateway.

In an embodiment, the filter is configured to extract the packets from a data tunnel to the home data packet gateway and to create a continuation of the data tunnel to the home data packet gateway alongside the diversion tunnel.

In an embodiment, the filter is configured to initially divert packets, and to cancel the diversion when the diverted packets attract access refusals and to re-send the packets to the home data packet gateway.

In an embodiment, the home network provides a subscription-based data service accessible through a portal, wherein the packet diverter is configured to select between packets addressed for the subscription based service and packets addressed for use outside of the subscription based service, and diverts only packets intended for the outside use without the need for the home network subscription.

In an embodiment, the packet diverter is configured to carry out the selecting by determining whether the packet contains a URL that maps to a portal of the home network.

In an embodiment, the packet diverter is further configured to detect when diverted packets return a no access error, to cease to divert packets corresponding to the no access error, and to re-send the corresponding packets to their original address.

In an embodiment, the filter is contained in a GTP signaling relay.

Alternatively, the filter is contained in an MIP or a PMIP signaling relay.

In an embodiment, data is channeled from the roaming mobile device to the relay via a serving GPRS support node—SGSN, wherein a data packet gateway comprises a GGSN—the relay comprising an SGSN/GGSN emulator, emulating an SGSN to the home network GGSN and a GGSN to the roaming network SGSN.

In an embodiment, the networks are all-IP networks wherein data is channeled from the roaming mobile device to the relay via a serving gateway, and wherein a data packet gateway comprises a PDN gateway, the relay comprising an serving gateway/PDN gateway emulator, emulating a serving gateway towards the home network PDN gateway and a PDN gateway towards the roaming network serving gateway.

In an embodiment, the diverted packets are diverted towards local breakout at a local PDN gateway alongside voice packets.

In an embodiment, the packet diverter is configured to divert by replacing the address of the home data packet gateway or a name identifying the home gateway with the address of the local data packet gateway within the inspected message.

An embodiment may comprise a packet return path for data packets to the roaming mobile user, the return path configured to set all returning packets to a given roaming mobile user to a same IP address.

In an embodiment, the diverted data packets are notified to the home network for charging.

In an embodiment, call data records are sent to the home network for the charging.

An embodiment may comprise an OCS relay to decide whether to charge the roaming user at the home network or at the local network.

In an embodiment, the decision to charge is based on the presence or absence of a subscription of the roaming user at the local network.

In an embodiment, a charging relay is provided at the local network for managing charging for the data, the charging relay being associated with the filter to send charges for the diverted data to the local network and to send charges for other data to the home network.

According to a second aspect of the present invention there is provided a method for providing local access to data while roaming with a mobile telephony device at a roaming network, the telephony device being associated with a home network separate from the roaming network, the method being carried out at the roaming network and comprising:

inspecting packets to identify data packets addressed from the roaming telephony device for use via a home network data packet gateway;

diverting at least some of the identified packets to a local data packet gateway; and setting up a diversion tunnel for additional packets having packet information corresponding to the diverted packets, the diversion tunnel directly routing the packets having the corresponding packet information to the local data packet gateway.

The method may comprise extracting the packets from a data tunnel to the home data packet gateway and creating a continuation of the data tunnel to the home data packet gateway alongside the diversion tunnel.

The method may comprise:
initially diverting packets as a default setting; and
cancelling the diversion when ones of the diverted packets attract access refusals,
and following the cancelling, sending the ones of the diverted packets to an original destination.

The home network may provide a subscription data service accessible through a portal, and the method may comprise:
selecting between packets addressed for the subscription data service and packets addressed outside of the subscription data service; and
diverting only those packets addressed outside of the subscription data service.

The method may comprise carrying out the selecting by examining layer 7 data of the packet to find a URL and determining whether the URL maps to a portal of the home network.

In an embodiment, the diverting comprises exchanging the address of the home data packet gateway or a name identifying the home gateway with the address of the local data packet gateway within the inspected header.

The method may provide a packet return path for data packets to the roaming mobile user, the method comprising setting all packets in the packet return path to a respective roaming mobile user to a same IP address.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
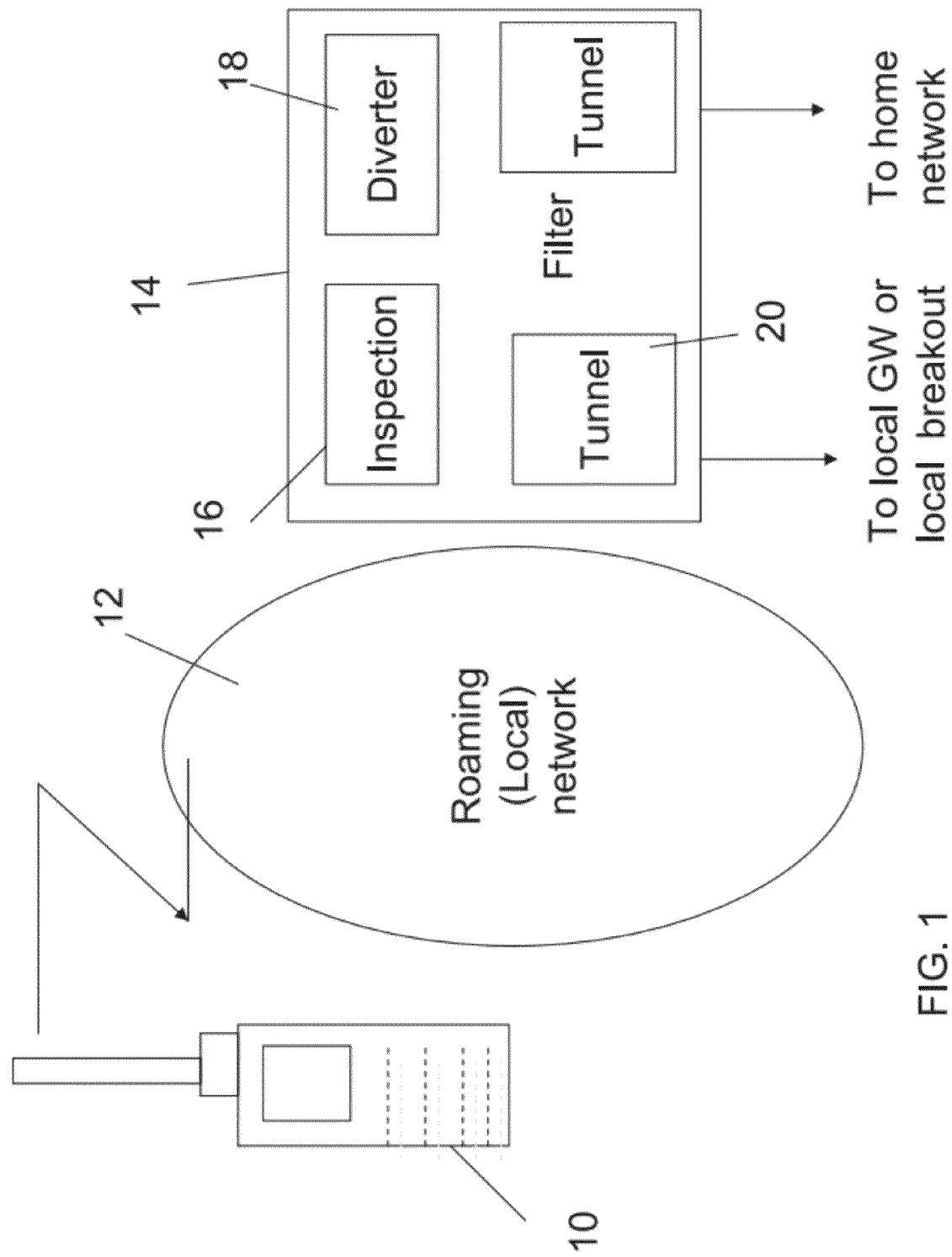
FIG. 1 is a simplified diagram illustrating a relay device located at a roaming network according to the present embodiments.

The present embodiments provide local routing or local breakout for roaming data services as well as voice. The present embodiments provide a system and method for enabling local management of data traffic, and in the case of the LTE network, local breakout of roaming data in general. Embodiments enable the visited network to manage relevant parts of the roaming data by itself, while other parts can still be managed by the home network.

Local breakout LBO fundamentally changes the situation for data roaming. So far in GPRS networks, the data has always been routed to the home network. However, if the local breakout system can apply itself to data as well, then a cheaper and higher quality system of data roaming may be provided.

The idea of a new product according to the present embodiments, which may be referred to as Local Roaming GPRS or (LRG) is to provide local access to GPRS while in roaming. The same concept is applied for EPC/LTE 4G networks, as explained below, and these networks do not use GPRS. Thus GPRS is mentioned herein as an example only. That is the embodiments may provide an IP connection for the roaming subscriber via the visited network directly, without the need to route the data to the home network first. The Internet connection may be provided with a much higher QoS, and potentially at a much lower cost. In fact, the service can be provided at a local GPRS tariff, i.e. the same tariff used for local network subscribers. This service may then provide real competition for WiFi at hotels for example, for travelers. However the tariff is a matter for the operator, keeping in mind that data roaming is still very expensive, despite attempts at cost reduction in Europe, and prevents roamers from consuming more data.

There are two main options for charging:

(1) keep charging via the home network (2) use a local prepaid or postpaid account in the visited network.

The first option requires coordination between the visited and the home networks. Call Data Records (CDRs) may be sent from the visited to the home network—as for voice calls. Prepaid users can be charged on-line via CAMEL or using proprietary solutions. The second option does not require any coordination with the home network. The visited network can operate the service on its own, but it needs to market the service to the inbound roamers, and convince them to purchase local prepaid cards, or use a credit card for a postpaid account, that is not to pay in advance, but provide the credit card details to the roaming network for opening a postpaid account, or by any other method.

The charging may be differentiated as well, and voice charging may be handled by the visited network in the first place and then handed over to the home network, or perhaps handled locally—potentially as a local prepaid account. The local charging poses new requirements for the VPMN, and new opportunities as well.

In the following, a prepaid mode is discussed by way of example only, for the various credit solutions that may be used in the roaming network including postpaid via credit cards, and others. An Online Charging System (OCS) may be used for charging the inbound roamer, in the visited network.

The following discussion refers to GPRS and GRX (GPRS Exchange Routing) which relate to 2G/3G GPRS networks, but these are given only by way of example. The discussion also includes LTE networks. In either case the GTP (GPRS Tunneling Protocol) may be used as a carrier for IP traffic. In LTE networks, MIP (Mobile IP) or PMIP can be used as an alternative to GTP, hence the present embodiments covers both GTP and MIP/PMIP.

In the LTE case, instead of SGSN and GGSN, which relate to 2G and 3G networks, such components as the "Serving Gateway" (S-GW) and PDN Gateway (PDG), provide the corresponding functions respectively.

The following discusses the invention by way of an example based on GSM. However the invention is equally applicable to CDMA.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which illustrates apparatus for local access to data while roaming. A mobile telephony device 10 operates at a roaming network 12, which now becomes the roaming user's local network. The telephony device is associated with a home network (FIG. 2) which is separate from the roaming network at which the device 10 is registered.

The apparatus comprises a filter 14, which has a data packet or packet header analysis unit 16. The analysis unit 16 looks generally at the headers of packets passing the filter to identify data packets addressed from the device 10 for data use via a home network data packet gateway. Such data is generally found in the header but may be located elsewhere, and the filter may be designed to search for the information as appropriate in any given case. Such data packets are thus identified as data packets, meaning packets for Internet services, such as email or browsing or datastreaming or other network services, or intranet services or the like. A packet diverter 18 diverts some or all of the identified packets to a local Internet data packet gateway which may be a local breakout gateway in the 4G system.

The filter 14 may set up a diversion tunnel 20 for additional packets having packet headers corresponding to the above diverted packets. Generally a particular data session or service involves multiple packets, having in common similar entries in particular parts of the header. The tunnel ensures that once the first packet of a session has been identified then later packets belonging to the same session can be identified more simply and directed to the same output. The diversion tunnel 20 thus routes those packets having packet headers corresponding to earlier identifications directly to the local data packet gateway.

It is noted that, in addition to diversion tunnel 20 to the local gateway, there is a diversion tunnel 21 to the home gateway as well. The starting point for the GPT tunnel is the SGSN in case of GPRS traffic, or Serving GW in case of LTE. A second tunnel is needed at the relay because it is not possible to chain end points for the data tunnel. As soon as the relay receives the data it makes itself a tunnel end point, and in order to relay it to the original destination it becomes necessary to open a new tunnel. This is because GPT data is already tunnel data.

That is to say, an initial GPT tunnel to the home gateway, which was set up by the V-SGSN, is cancelled at the relay since the relay needs to access the packets. The cancelled tunnel thus needs to be recreated at the relay, and the relay emulates the SGSN starting point for tunnel 21, as well as creating diversion tunnel 20. Hence the relay forms two new tunnels from the single GPT tunnel.

It is noted that the packets do not always contain the IP address of the final destination. Often they may contain a name, an APN, which has not been resolved yet by the local DNS, and may be resolved later, in a higher level DNS, at the international carrier GRX for example. It is also noted that the local gateway will always be an IP address, since there is generally no further name resolution in the local network.

The home network typically provides its own subscription-based or internal data service, which is accessible only through its own portal, a set up known as a walled garden. If the data packet requires a session within that walled garden then it needs to be sent to the home network without being diverted, since such services are only accessible from the home network gateway. Thus the packet diverter may look for packets having destination addresses within the home network, say by comparing a final destination URL or APN or IP address in the header to the network. Then those packets addressed for the subscription based data service and packets addressed for use outside of the subscription based home network data service can be distinguished. The packet diverter may then divert only those packets intended for use outside of the subscription based data service.

Thus the packet diverter may determine whether the packet header contains a URL that maps to the Internet portal of the home network and if so then the packet is not diverted.

If a walled garden destination is erroneously not identified and a packet intended for such a destination is diverted to the local gateway then it will not be given access to to the walled garden and a No Access error will be returned. Thus, as a fallback position, in case a walled garden destination is erroneously not identified, the packet diverter looks for diverted packets that return a No Access error or a similar error code. The diversion of the corresponding session may then be cancelled, and the data may be re-routed to the home gateway.

In one embodiment, all sessions are by default directed to the local V-GSSN. Then, if a No Access error is returned, it is assumed that the address is part of the walled garden of the home portal. Thus when a No Access error is received, the session is then sent directly to the home portal.

In another embodiment header data is analyzed and the session is sent to the walled garden or to the local gateway as appropriate. However, if the header is not specifically recognized as being directed to the walled garden then the default setting of the local V-GSSN is used. Again, if a no-access error is received then the session is redirected to the walled garden.

Figure 2:
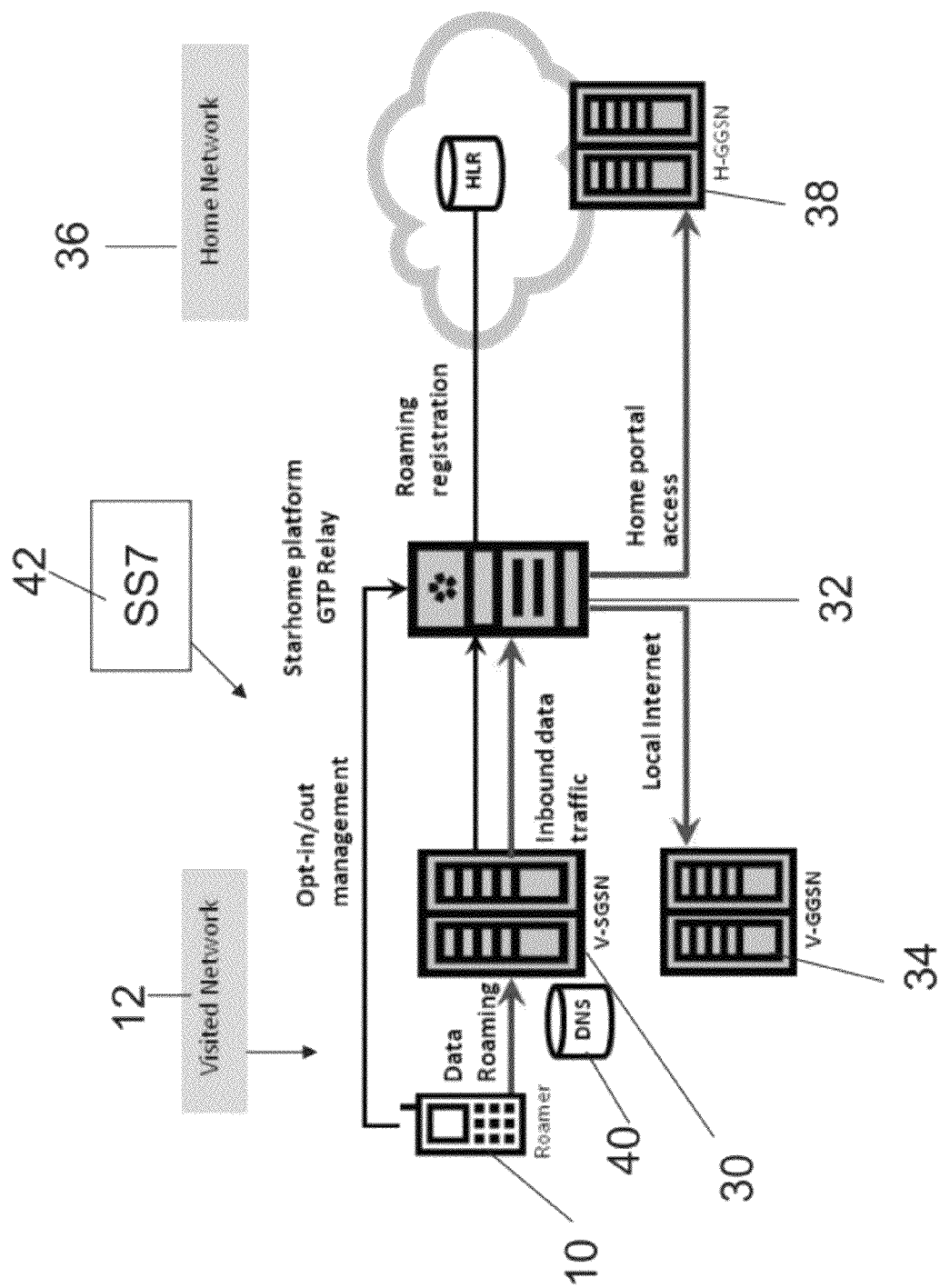
FIG. 2 shows the relationship of the relay of FIG. 1 to both the home and roaming networks and various gateway components therein.

Reference is now made to FIG. 2 which is a simplified block diagram showing elements of the roaming or visited network and the home network. Data from the roaming device 10 is directed at roaming network 12 to a serving GPRS support node of the visited network, V-SGSN server 30.

The filter 14 may be contained in GTP signaling relay 32, and selects some of the sessions for diversion to the roaming network V-GGSN 34 to provide a local data service, and lets the remainder of the data continue to the home network 36 and the H-GGSN 38. Selecting may be according to the principles already discussed.

As an alternative to a GTP relay, the filter may be contained in an MIP signaling relay—depending on the details of the roaming network.

Within the system, the SGSN 30 is the switch at the visited network that receives data from the mobile device. The SGSN conventionally sends the data to the GGSN 38 which is always at the home network. All data requiring Internet access is conventionally required to pass through the GGSN 38. Between the SGSN and the GGSN, packets are passed using the GTP—or GPRS Tunneling Protocol. GTP keeps the data in the form of IP packets but packages them securely. Once reaching the H-GGSN the data may remain within the walled garden of the provider—via an Internet portal, or access may be allowed to the external Internet.

Thus, as per the convention, the data in the present embodiments is channeled from the roaming mobile device 10 to the SGSM 30. However unlike the conventional setup, the GTP data sent on by the SGSM 30 is intercepted by GTP relay 32. The SGSM does not know about the relay and expects to communicate with a packet data gateway or GGSN. Hence the relay includes an SGSN/GGSN emulator, emulating an SGSN to the GGSN, and also emulating a GGSN to an SGSN for the reverse direction. Thus both SGSN and GGSN communicate with the relay in the normal way that they would communicate with each other. The SGSN and GGSN do not need any changes to be made to themselves.

FIG. 2 illustrates a 3G network. For a VoIP or LTE 4G network, data is channeled from the roaming mobile device 10 to the relay via a serving gateway SG, and the Internet data packet gateway comprises a PDN gateway. In this case the relay includes a serving gateway/PDN gateway emulator which emulates a serving gateway to a PDN gateway and a PDN gateway to a serving gateway.

Figure 7:
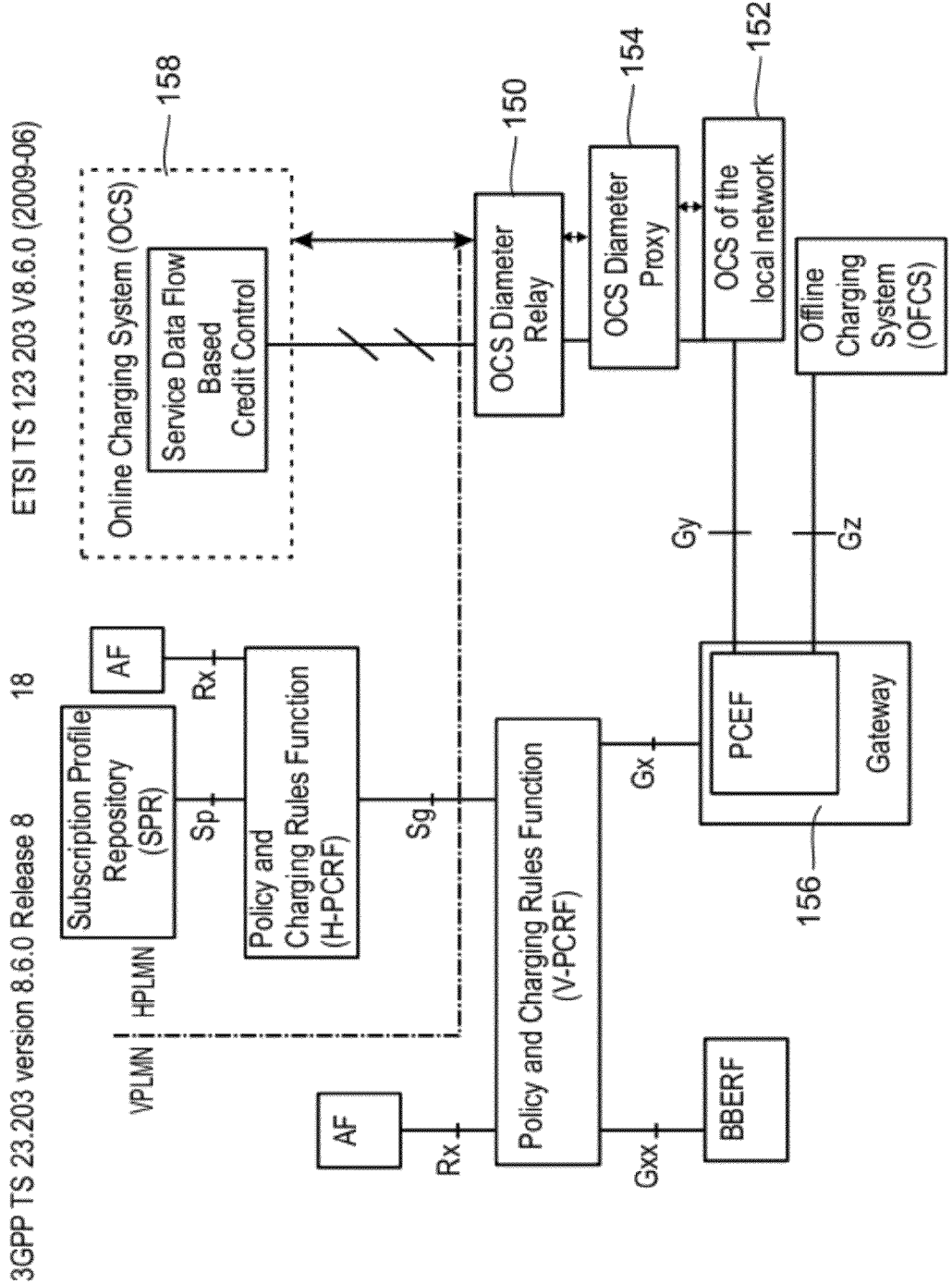
FIG. 7 is a simplified diagram illustrating charging components for Diameter based charging on a 4G network.

The diverted packets may be diverted towards local breakout at a local PDN gateway alongside voice packets. Typically the voice packets in the LTE network are directed automatically towards local breakout as they would never have been addressed to the home network in the first place. An LTE network is shown in FIG. 7 and discussed in greater detail hereinbelow.

Returning to the filter, and the packet diverter 18 may carry out the diversion process by exchanging the address of the home data packet gateway with the address of the local data packet gateway of the roaming network within the inspected header. The headers include an APN or access point name to get them from the cellular device to the SGSN. An example may be Example "Internet"@cellcom.gprs.org "<service>@provider.gprs.com—The APN may be checked at DNS 40 of the local operator. The packet further includes the address of the home network GGSN 38, to which the data is forwarded. However relay 32 exchanges the address of the home network GGSN 38 with that of the local network GGSN 34.

A packet return path allows data packets to return to the roaming mobile user in response to browsing requests etc. The packets in the return path have different destinations depending on whether they have been routed via the home or the roaming network. However the mobile device is only set up to deal with a single address. Thus the return path includes functionality to set all returning packets to a given roaming mobile user to the same IP address.

The IP address management is a further example of managing two tunnels from the relay, to the local and home gateways, with a single IP address towards the device. The initial IP address may be assigned by the local IP gateway, and the handset may obtain a local IP address. Then, we may replace the home IP address with the local IP address every time the home gateway sends a data packet towards the handset. By the same token also it is possible to replace the local IP address with the home IP address every time packets containing local IP address are sent to the home gateway.

In one embodiment, diverted data packets are notified to the home network for charging, for example using call data records (CDR)

In an alternative embodiment, an OCS relay may decide between charging the roaming user at the home network or at the local network. The decision may be based on whether or not the user has an account at the roaming network.

In the case of LTE, everything coming from the mobile telephone is sent in IP data packets, including voice. However the voice and other data such as browsing data are distinguished in that the voice packets are addressed for local breakout and the data packets are addressed to the data gateways.

In general MO voice calls go directly to local numbers without going home. LTE allows the voice data to go to a local gateway—the local breakout referred to above, and sends data to the local PDN gateway. The voice packets generally have a specific APN so that they can be easily identified and sent to the local PDN node.

The LTE network has a similar GTP (GPRS Tunneling Protocol) protocol carrier for data sent to the home network from the visited network and can apply the same criteria as discussed above, to choose between local and home network routing of the session, and thus to send appropriate data packets to the ePDG at the local or home networks. LTE networks can also use MIP (Mobile IP)/PMIP (Proxy Mobile IP) as a protocol carrier, instead of GTP, notably in the USA former CDMA countries.

The standard charging system for roaming in LTE assumes that the visited network PCEF (charging component) communicates with the home network OCS (On-line charging system), in case of local breakout (where the voice is fully controlled by the visited network). This is a complex solution, assuming close coordination between these two systems.

While using local roaming data, it may make sense to use a local prepaid account. A local prepaid account implies that the roamer is charged by the roaming network directly, the same network that provides the local data access. Such a solution may be implemented by an OCS diameter relay. An OCS diameter relay may intercept all traffic directed to the home OCS system, and may make a decision about whether to charge the subscriber via the home network or via a local prepaid system. The OCS relay is aware of whether any particular roaming user has a local prepaid account or a local postpaid account (via credit card for example) and thus is able to charge the card or account without involving the home network at all. If using the OCS diameter relay in this way then a Diameter proxy agent is required to change the subscriber identity for the local account, since this is the role of a Diameter Proxy.

It may be that the home and local networks apply different quality of service (QoS) rules for data use. For example the two networks may allocate different bandwidths. For example the home network may supply a 1M bandwidth whereas the local network gives only 0.5M. A system parameter may be available to choose between the two options. If the user has paid the local network through a local account, it may be given the local network rules, although the user may be offered a higher level of service at a different tariff. The usual preference amongst operators is to provide the home network rules, whether they are better or worse, as this is what the user is used to.

The V-PCRF component applies the standard QoS policies as defined for the given network. An application function (AF) can then be provided as an override to give a different QoS. The AF may include a local prepaid App function. The AF talks to both the V-PCRF and to the OCS diameter relay in order to provide the updated quality of service.

Embodiments of the present invention may provide any one or more of the following features:

The embodiments may improve QoS for data roaming since they obviate the need for data roaming to pass the home network data gateway. The embodiments may enable high speed video & internet at the same level of quality that the user is used to at his home-network.

Data roaming may be provided at a local tariff rather than an International tariff, depending on the charging policy of the local network.

The use of data roaming may encourage roaming users to make use of the data capabilities of their mobile devices rather than pay for say hotel Wi-Fi.

Roamers are in any event more willing to pay for high quality Internet access than for the lower quality enforced by the need to use the home network gateway.

The embodiments preserve access to the walled garden home portal for operator content that the subscriber is used to accessing.

For the operator, the present embodiments may reduce operational cost, save GRX (GPRS Exchange routing) charges, and may separate Internet access from the home portal or walled-garden, allowing the home portal to be accessed in the traditional way.

Billing can be left to the home network, unless the local prepaid system is selected by the user, and the service can be marketed to selected groups of subscribers.

The solution can be particularly of interest to specific profiles. For example business/corporate customers are heavy consumers of email and browsing options. Data card holders may be offered a special package for roaming, and generally heavy 3G consumers—such as users of specific mobile handsets users may appreciate a special package for roaming.

Figure 3:
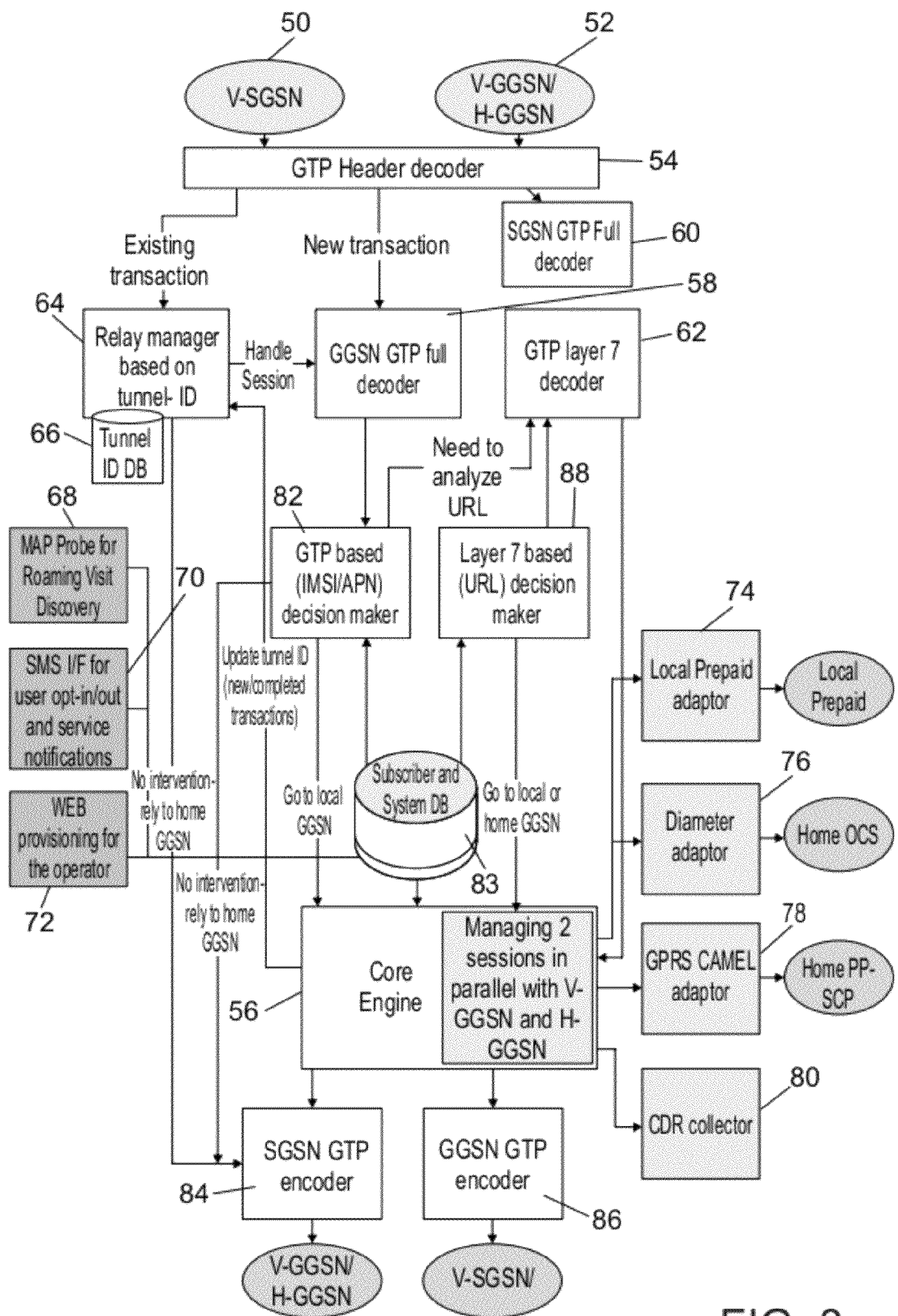
FIG. 3 is a simplified flow diagram showing process flows using the relay of FIGS. 1 and 2.

Service can be offered to inbound roamers from specific partnering home networks, say where the billing is coordinated with the home network, or where the home network agrees to service promotion via SMS The present embodiments provide for a platform to be installed at the visited or roaming network, as per FIG. 3. The platform provides a GTP relay, emulating an SGSN towards the real GGSNs, and emulating an SGSN towards the real V-GGSN. The visited network SGSN thinks it is routing traffic to the H-GGSN but actually the traffic goes to the relay which in turn decides whether to route the traffic to the V-GGSN or to the home H-GGSN. The traffic that is routed to the relay may be all data traffic, or data traffic whose home network is in the scheme, or data traffic of users who qualify for the scheme, depending on how the system is set up. The GTP relay analyzes the packet header for session information and determines if it should intervene or not. If the subscriber is subscribed to the service and the APN does not indicates a need for the home network walled garden, there the relay may intervene. In that case the GTP relay acts as an SGSN and opens a new transaction towards the local V-GGSN. Otherwise, the GTP relay relays the transaction to the home GGSN. The platform is therefore a GTP Relay (GTP=GPRS Tunneling Protocol), a signaling relay which can intercept, open and modify GTP transactions.

After modifying the destination address to the local V-GGSN, the relay may create a new PDP (Packet Data Protocol) context, i.e. initiate a new session towards the V-GGSN, acting as an SGSN. It is not possible to chain GGSNs; the GGSN is a termination point for the PDP transaction. Hence, the GTP relay may emulate what is termed a skim SGSN, that is an SGSN supporting only the commands required for the specific manipulations in question.

In the return direction, the GTP relay receives messages from the GGSN, and transmits them to the original SGSN. In this case, the GTP relay may emulate a GGSN, and may modify the returned IP address and transaction ID back to the originals prior to modification for sending to the V-GGSN.

Reference is made once again to FIG. 2, which illustrates the network architecture of an embodiment of local roaming GPRS (LRG).

The GTP relay platform 32 may be installed at the VPMN. There is no need for any platform or other modification in the home network.

The GTP relay may implement the following (high level) flow:

The V-SGSN may route inbound roaming data traffic via the GTP relay as a result of modifying the SGSN IP routing table. The relay may determine if there is a need for intrusive handling. For example, if the home network is not relevant, or the subscriber is not subscribed to the service, or the APN (Access Point Name) identifier of the service is the home walled garden, the session may be relayed to the home GGSN, without any modification.

If none of the above applies, then the relay may create a new PDP context towards the local GGSN, while acting as an SGSN. In this case, replies from the local GGSN may reach the relay platform in the return direction, and the relay may then modify the local GGSN IP address and transaction ID back to the original, while acting as the home GGSN towards the local SGSN, the local SGSN having initiated a transaction to the home GGSN.

In both cases, the transaction ID may be kept, for handling subsequent messages on the same route. The subsequent messages need not contain all details since the details are contained in the initial PDP context.

For each device, the relay creates two kinds of PDP contexts, one to the local V-GGSN and one to the home H-GGSN, whilst acting as an SGSN for both. Thus, APNs may serve both walled garden and local access. Any individual session is thus analyzed to determine dynamically, based on the URL, whether to route locally or via the home network. The relay manages two IP addresses, but provides only one of them to the mobile device, which would not be able, at least without modification, to deal with two IP addresses.

In the LTE case, the separation between VoIP and data may be based on APN. Clearly all VoIP data can be sent to local breakout, if identified by a dedicated APN, such as "IMS". In greater detail, there are two parameters that may be used for distinguishing between VoIP and data,—APN and URL data. But a problem arises in that there is no specific APN associated with any data application. That is to say there is no standard. Rather the APN is operator specific—since it is only used to get to the home gateway, the operator tends to use its own language. For the voice, they define a standard APN— "IMS" to distinguish voice from data, and thus an APN is sufficient to distinguish voice from data. However, the APN does not distinguish between for different data types. Therefore the present embodiments may identify the walled-garden data, and route all the rest to the local gateway using URL analysis. However the URL data is at a deeper level within the packet, typically what is known as level seven. The URL data is thus used after the APN, to identify within the APN how to divert the data. A URL-based separation enables the user to access the home network for specific web sites, those which are part of the walled garden, for example, but to enjoy local access to the Internet for most of the web sites. Rerouting is not restricted to identifications made at the beginning of a session, but can also be carried out later on during the session and splitting the session between the home and visited networks. Thus a first part of the session is charged by the home network, and the second part by the visited network.

In one embodiment, an SS7 probe 42 is used to monitor roaming activity and to indicate the arrival of an inbound roamer. The probe may allow a trigger, from the roaming registration, to send a message to the newly registering roamer to offer the service to the roamer. The probe may likewise allow a trigger for roaming cancellation which can be used as an alert to stop the service. An SMS interface may be used with the inbound roamers to manage opting in and out for the service using the input from the probe.

The platform may be provided with web based provisioning, to allow the operator to carry out system configuration.

Reference is now made to FIG. 3, which is a simplified flow diagram of the system, showing data flow including service flow.

The figure covers the two directions of flow, that is (a) The flow from the visited network SGSN 50 to a GGSN 52 (either local or home)—the outward direction from the mobile device, and (b) The flow from the GGSN 52 (either local or home) to the visited SGSN 50 and from there back to the mobile device.

When a new packet is received from the mobile device, a first task is to decide if this is a new session. A second task is to determine whether the user is subscribed to or eligible for the service. These tasks may be carried out at the GTP header decoder 54.

If the local data service is required then the core engine 56 of the relay platform changes the address. The address to be changed may be the APN or may be what a local DNS has swapped for the APN, or may be a URL included in the header.

A message comes from the SGSN 50 so the relay acts as a GGSN 52 to correctly handle and acknowledge the message. To do this the relay includes GGSN emulation or, as shown in the figure, a GGSN full decoder 58.

The packet now exits the core engine 56 with a gateway IP address which may be either the local or the home GGSN.

A reply is then received.

The reply comes from one or other of the GGSNs 52 so the relay has to include SGSN emulation, or an SGSN full decoder 60. No decisions are needed for the return leg as all data goes to the mobile device. However the data has to be sent with a single IP address whereas it arrives with either of two addresses due to the two different sessions—home network and local network. The sessions may be kept transparent to the mobile device which expects a single address and thus should not see that two sessions are running.

In the outward direction, packet header inspection looks for a URL and thus reads layer 7 data from the packets. A GTP layer 7 decoder 62 is used.

Layer 7 checks the URL to see if it maps to the network indicated as the user's home network, and if it does then not to divert the packets in the first place, thus avoiding having to wait for an access error in those cases. Once a session has been identified, then all packets belonging to that session are recognized as an existing session and are routed via a relay manager 64 to either the visited or the home network. without any further intervention beyond replacing IP addresses back and forth, as explained hereinabove.

MAP probing to offer the service to new arrivals is provided as per box 68. An SMS interface for notifications is provided in box 70, where the notifications may be to do with offering the new service or could relate to the service in general. Web provisioning for the operator is provided in box 72.

The flow provides three ways to pay for the service. In box 74 the local prepaid system allows the user to purchase a card with a number. A local prepaid solution allows all charges to be settled at the visited network. The necessary interface with the local prepaid system, via IN or proprietary interfaces is provided through Local Prepaid adaptor 74.

Box 76 allows charging via the home OCS (online charging system) through a Diameter adaptor. Note that in pre-LTE networks, Diameter is not the cross-network protocol, and is used only between the GGSN and the billing system. Hence a Diameter adaptor was needed to connect to the home charging system. In order to provide on-line charging an interface may provide direct access to the home OCS (On-line Charging System). Such an interface may be located between the relay platform acting as a GGSN and the home network OCS. To achieve such an interface, Diameter Adaptor 76 is connected to the core engine unit.

Box 78 provides for charging through the Camel System. Both Diameter and Camel can support charges in real time which appear on the regular bill provided from the home network. Box 80 shows Call Data Records (CDR) being sent from the core engine to the home network for the purpose of non-real-time or near-real-time charging at the home network. For home networks that do not support Diameter and OCS, CAMEL triggers towards the home prepaid-SCP platform allow for support of prepaid users. The relay platform then acts as an SGSN, issuing CAMEL triggers. The GPRS-CAMEL adaptor unit 78 may implement such support.

Figure 4:
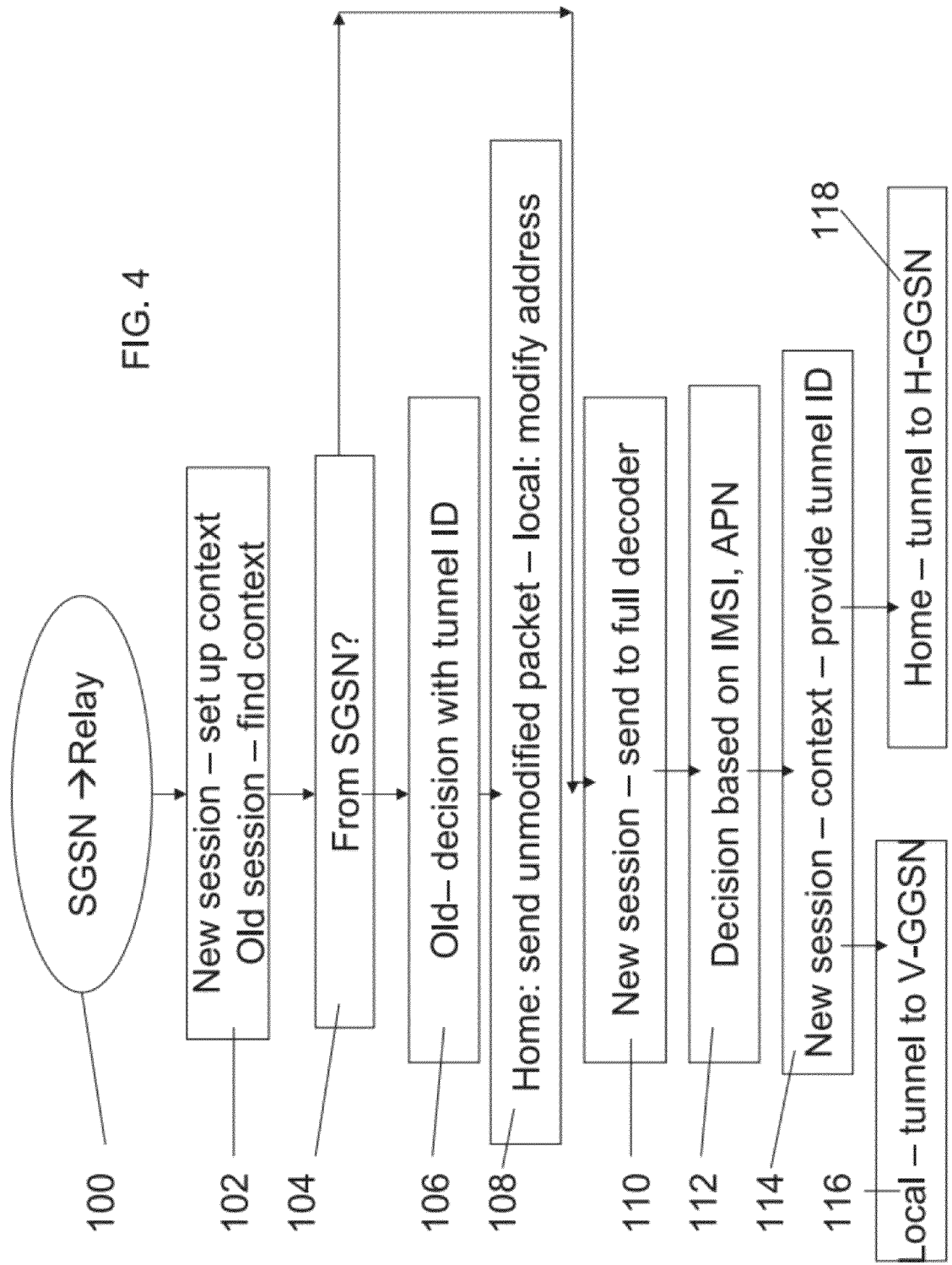
FIG. 4 is a simplified flow chart illustrating the outgoing flow from the mobile device according to the present embodiments.

The SGSN-to-GGSN Direction:

Referring now to FIG. 4, the SGSN to GGSN data flow direction is shown in greater detail. When initiating or continuing a data session, the signaling is routed from the V-SGSN of the visited network to the relay platform—100. For a new session a new PDP-context is created by the SGSN. That is to say, the real SGSN creates a new context, for a new session, for example when the user starts the browsing session. The session however is terminated by the relay, acting as a GGSN termination point. Then the relay creates a new context towards the real GGSN, acting now as an SGSN. This new context may be kept with other contexts, created by the relay. For an existing session, an on-going data transaction is set up—102.

The GTP header decoder analyzes the GTP header of the incoming message and determines if the message comes from the SGSN or a GGSN—104. The flow of FIG. 4 deals with a message received from the SGSN, while that of FIG. 5 deals with the other direction. As per the above, the GTP header decoder 54 determines if the current packet is part of a new session (a PDP-Context-Create message) or of an existing session. In the case of an existing session the decision about local/home routing has already been taken, and the message is transmitted to the Relay Manager 64. In the case of a new session the flow jumps to 110. At 110 the control may be handed over to the GGSN GTP full decoder 58, for further analysis.

For a known session or context the Relay Manager utilizes the previous decision according to the tunnel-ID—106. For home GGSN routing, the message is relayed directly, without modifications 108, except for minor address modifications etc. For local GGSN routing, the control is given to the GGSN GTP full decoder 58, for further analysis 110, as mentioned above.

The GGSN GTP full decoder 58 performs full decoding of the GTP message, acting as a GGSN.

The control is forwarded to the GTP decision maker 82. The decision as to where to forward the session—112, may be based on two main parameters: the IMSI (identity) of the subscriber and the APN (the application to be used). In addition, the URL may be used, if the layer-7 data is decoded as well. If the subscriber has an opt-in to the service, and if the APN indicates that the local GGSN can serve the subscriber (such as in the case of APN=internet), the transaction is routed to the local GGSN. Otherwise, it is routed to the home GGSN.

Control is placed in the hands of the Core Engine unit 56. The core engine becomes the session manager for all sessions going into or out of the GTP layer. In the flow described so far, the core engine unit may emulate an SGSN towards the local GGSN. In the case of a new transaction, the core engine may create a new PDP-context, allocating a new tunnel-ID. A new transaction and corresponding allocation of a tunnel ID is something which may take place once per every session. The new tunnel ID is then provided to update the Relay Manager, so that next time the same header appears the ID will be automatically recognized—114. The new transaction defines either local 116 or home service 118.

In the case of an existing transaction where the tunnel ID defines local service, the core engine directs the transaction towards the local GGSN, modifying the relevant parameters such as by replacing the original SGSN address with its own address—108. Finally, the core engine invokes the SGSN GTP encoder, in order to create and send an SGSN-like message to the local GGSN.

The core engine unit and the decision maker unit may use the subscriber and service provisioning database 83 for relevant data, say to find out whether the subscriber is eligible for the service.

The SGSN GTP encoder unit 84 may encode an SGSN-like message and send the message to the local GGSN, acting as an SGSN.

The core engine unit may also invoke the CDR controller 80.

Figure 5:
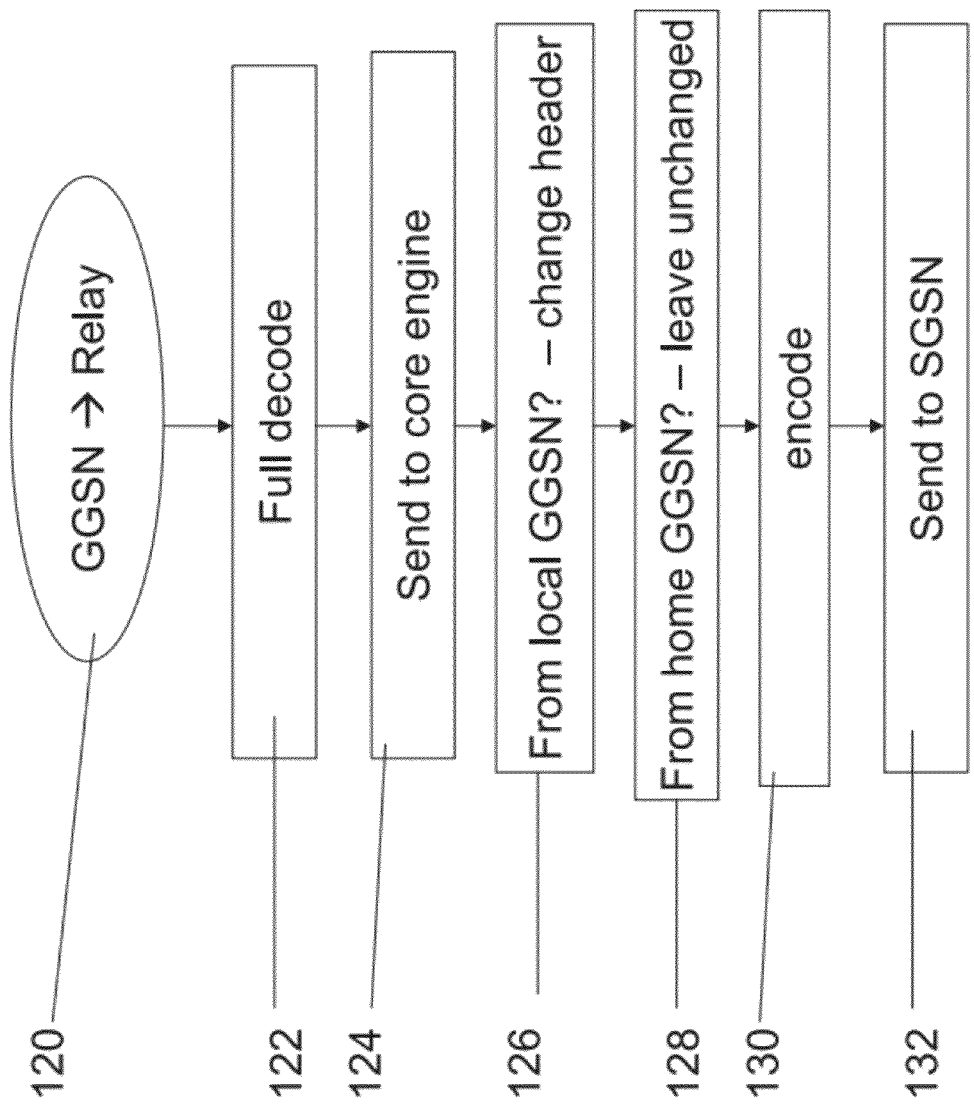
FIG. 5 is a simplified diagram showing the incoming flow corresponding to that of FIG. 4, according to the present embodiments.

The GGSN-to-SGSN Direction:

Reference is now made to FIG. 5 which is a simplified schematic flow chart illustrating the flow when the data packets are traveling in the reverse direction, that is back to the mobile device. In this case the transaction is not new, as it arrives from a GGSN—120, and the GTP header decoder 54 may transmit the transaction to the SGSN GTP full decoder unit 60, as the relay is now acting as an SGSN.

The SGSN GTP full decoder 60 fully decodes the message—122, and transmits it—124—to the Core Engine 56, which performs the main processing in the present flow as well.

If the transaction has arrived from the local GGSN, the IP address of the local GGSN and the tunnel ID may be replaced with the address of the home GGSN—126. Thus the local routing is rendered transparent to the local SGSN which is to receive the message.

If the transaction has arrived from the home GGSN, it may then be relayed to the local SGSN unchanged except for minor modifications to the IP address—128. However encoding for the GGSN emulation—130 may be required.

The GGSN GTP encoder 86 may create the GGSN-like messages, to emulate a GGSN, towards the local SGSN.

Reference is made again to FIG. 3. A further flow deals with the case where APN analysis is not sufficient to determine whether to select local or home routing. A scenario of a mixed home-local session is provided. The user may start the data session at the home operator portal, the walled garden, and then access the internet from the portal. Two separate sessions may handle the case, where the walled garden session is managed by the home GGSN, and the internet by the local GGSN. There is a need therefore for a URL analysis, rather than just an APN analysis since the APN in such a case would always point to the home network even though the user is now browsing outside the walled garden.

The GTP layer-7 decoder may further decode the layer 7. Layer 7 contains the URL of the session and additional parameters at that level, and requires a complex analysis unit.

After decoding at the layer 7 decoder 62, the message may be forwarded to the layer-7 decision maker 88, which determines the local or home routing based on various relevant parameters, for example by comparing the URL to the home network of the mobile device.

The message may be transferred to the core engine 56, which now handles two sessions in parallel. There is a need to assign two tunnel-IDs, and handle a unified session context for the two sessions.

Figure 6:
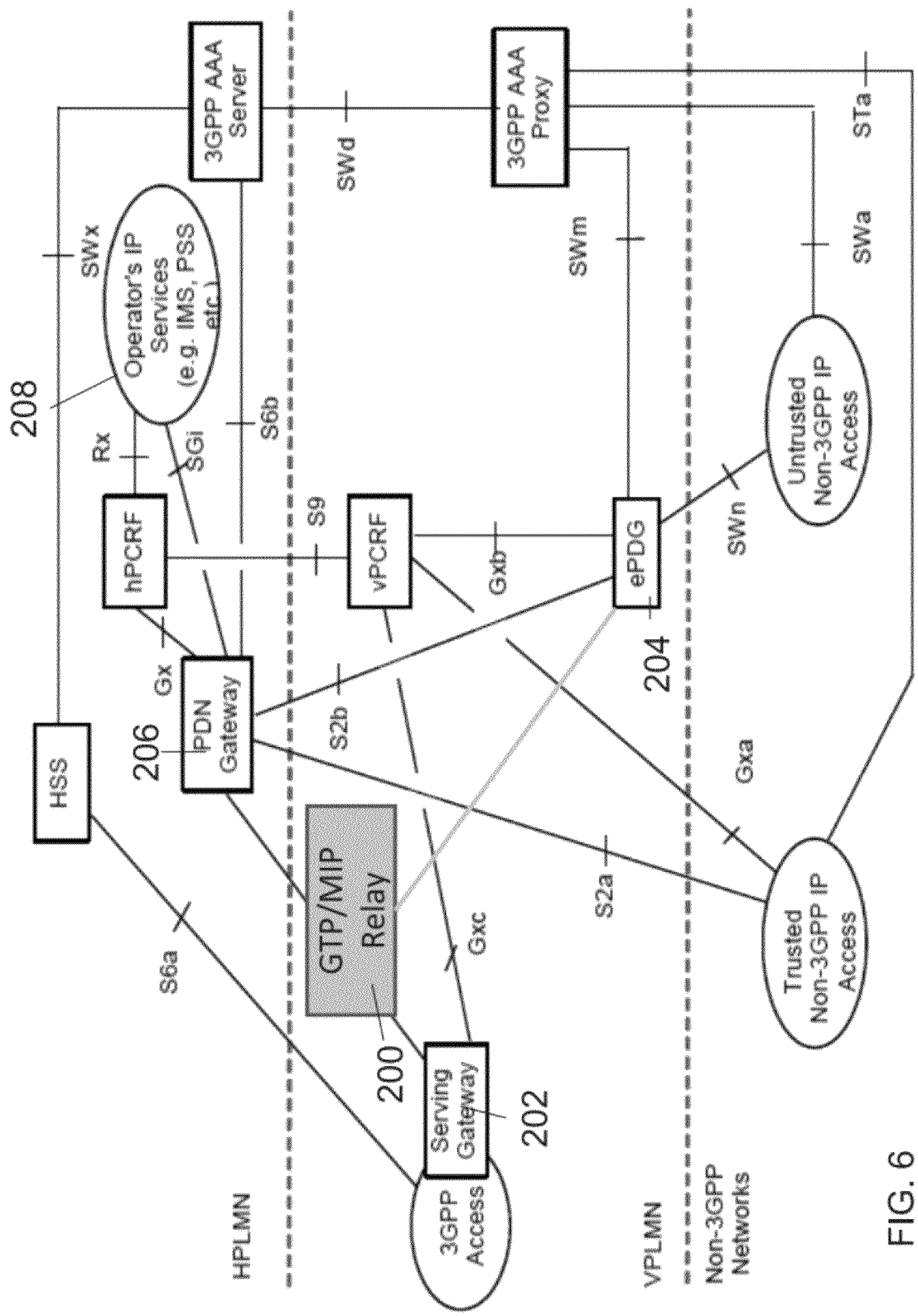
FIG. 6 is a simplified block diagram of the relay of FIG. 1 set up on a 4G network according to an embodiment of the present invention.

Reference is now made to FIG. 6, which is a simplified diagram illustrating an LTE network according to an embodiment of the present invention. GTP relay 200 is located at the visited network VPLMN and decides whether to route traffic from serving gateway 202 to ePDG 204 of the visited network, or to PDN gateway 206 at the home network HPLMN. The operator's subscription-based services or walled garden 208 may by way of example be accessible from the home PDN gateway 206, although such is a matter for the operator to decide.

Charging using Diameter and LTE Networks

Reference is now made to FIG. 7 which is a block diagram of the charging components of an LTE or fourth generation 4G network. FIG. 7 shows the basic network with additional components required for data charging according to the present embodiments. In order to implement a local prepaid solution for inbound roamers, the local prepaid system used by the domestic (local) subscribers may be used. However there is a need to couple the roaming identity with a local identity, associated with a local prepaid account. Such coupling may be implemented by a relay platform.

In order to implement the above, Diameter Relay Agent 150 is able to control diameter charging messages going to the home OCS, and determine which messages can be routed to the local prepaid system. For the messages going to the local OCS 152, there is a need to replace the subscriber identity inside the messages, so the local prepaid system can handle a local identity, according to the local tariff. The Proxy OCS 154 may used to actually modify the messages, as this is the role of the Diameter proxy, and may also proxy the active pairs of identities for the active sessions going on with the OCS(s) in order to increase efficiency.

The system has two main components, the OCS Diameter Relay 150, and the OCS Diameter Proxy 154 and interfaces with system management for the local roaming prepaid service.

The OCS Diameter relay component 150 relays all Gy messages, or in alternative embodiments Ro and Rc messages going from the V-PCEF 156, the visited network policy and charging gateway and H-OCS 158, determining which should be handled by the local prepaid system. These messages may be relayed to the local OCS 152 after replacing the roaming identity of the subscriber with a local identity. The actual replacement may be done by the OCS proxy 154, as discussed below.

The relay platform may intercept all Diameter messages, going to a specific home network (or all home networks), enabling the examining of message content, and routing the message either to the home network OCS or local OCS.

The relay may fetch and analyze subscriber identity, for example the IMSI, from the Diameter messages, and compare against the local prepaid subscriber database/proxy server. If a local prepaid roaming user is identified, the message is handed over to the OCS Proxy component 154 for replacing the roaming identity and manipulating the message content accordingly. The same manipulation may also be provided for messages going back from the local OCS to the core network, replacing the local identity with the roaming identity. There is also an option to split between the local and home OCS during a session, which is discussed hereinbelow.

The OCS proxy 154 may make actual replacements in the message content, and may also proxy the active couplings between roaming and local identities, by keeping all modified portions of the messages in the cache, in order to save processing time.

The OCS proxy 154 may then check whether this is the first time such an old/new pair of identities has been introduced. If the pair already exists in the cache, then the system uses existing information, and replaces all of the Diameter relevant part of messages with the alternative. The alternative may be the local identity for the direction towards the OCS, and the roaming identity for the reverse direction, or other relevant parts. If however, it is the first time that the identity pair has appeared then the system may obtain the relevant information from the prepaid subscriber database, compose the new message and replace the information.

An issue with retaining the data is to identify session termination, which is the last time the specific pair is to be used, so it can be deleted from the memory. A solution may be to use a timer and identify any sessions where there has been no active transactions, for a predetermined period of time, or explicitly identify session termination messages A system for local prepaid service management may comprise a user interface, prepaid account activation, and a top up system. The user may access the system via web provisioning or SMS or any other communication means. The user may enter his/her local prepaid card details, following which the system may activate a new account, or top up an existing account. The system may associate the user roaming identity with a local identity, and open the prepaid account using the local identity. The prepaid system of the roaming network then handles the roaming subscriber as if he/she is a local user belonging to the local network.

FIG. 7 thus shows a modification of the standard charging infrastructure, in which the OCS Relay 150 and the OCS Proxy 154 enable the local roaming prepaid system using the local OCS platform 152. It is noted that the local OCS platform 152 may present in conventional layouts for serving local subscribers.

In the above description of the OCS-Proxy 154, all charging of a local prepaid subscriber is routed to the local OCS 152. There may however be a scenario in which the data that is routed either to the home PDG (PDN Gateway) or local PDG according to the routing decision, is diverted between the home network and the local network. Such a scenario is the walled garden scenario referred to above, which may occur if, for example, the data is addressed to the home portal of the operator, and can be accessed only via the home PDG. The decision regarding home/local routing is made by the GTP-relay 32 as discussed above. The OCS-relay may thus simply follow the GTP-Relay decisions, and route the Diameter charging messages accordingly, splitting them between the home and visited OCSs. The internal database of the GTP-Relay, which stores all current active sessions, may be made accessible to the OCS-Relay as well, so that inspection of the GTP relay database is all that is necessary to determine which session or part of the session is routed to the home network and which is routed to the visited network.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for local access to data while roaming with a mobile telephony device at a roaming network, the telephony device being associated with a home network separate from said roaming network, the apparatus being located at said roaming network and comprising:

a filter having a data packet inspection unit for inspecting packets to identify data packets addressed from said roaming telephony device for use via a home network data packet gateway, and a packet diverter for diverting at least some of said identified packets to a local data packet gateway;

said filter being further configured to set up a diversion tunnel for additional packets having packet destination information corresponding to said diverted packets, said diversion tunnel being for locally routing said packets having corresponding packet destination address information to said local data packet gateway, wherein said filter is contained in a GTP signaling relay, and data is channeled from said roaming mobile device to said relay via a serving GPRS support node—SGSN, wherein a data packet gateway comprises a GGSN—said relay comprising an SGSN/GGSN emulator, emulating an SGSN to the home network GGSN and a GGSN to the roaming network SGSN.

2. Apparatus according to claim 1, wherein said filter is configured to extract said packets from a data tunnel to said home data packet gateway and to create a continuation of said data tunnel to said home data packet gateway alongside said diversion tunnel.

3. Apparatus according to claim 1, wherein said filter is configured to initially divert packets, and to cancel said diversion when said diverted packets attract access refusals and to re-send the packets to said home data packet gateway.

4. Apparatus for local access to data while roaming with a mobile telephony device at a roaming network, the telephony device being associated with a home network separate from said roaming network, the apparatus being located at said roaming network and comprising:

a filter having a data packet inspection unit for inspecting packets to identify data packets addressed from said roaming telephony device for use via a home network data packet gateway, and a packet diverter for diverting at least some of said identified packets to a local data packet gateway;

said filter being further configured to set up a diversion tunnel for additional packets having packet destination information corresponding to said diverted packets, said diversion tunnel being for locally routing said packets having corresponding packet destination address information to said local data packet gateway, said home network providing a subscription-based data service accessible through a portal, wherein said packet diverter is configured to select between packets addressed for said subscription-based service and packets addressed for use outside of said subscription-based service, and diverting only packets intended for said outside use without the need for the home network subscription, wherein said packet diverter is configured to carry out said selecting by determining whether said packet contains a URL that maps to a portal of said home network.

5. Apparatus according to claim 1, wherein said packet diverter is configured to divert by replacing an address of the home data packet gateway or a name identifying the home gateway with an address of the local data packet gateway within said inspected message.

6. Apparatus according to claim 1, further comprising a packet return path for data packets to said roaming mobile user, said return path configured to set all returning packets to a given roaming mobile user to a same IP address.

7. Apparatus according to claim 1, wherein said diverted data packets are notified to said home network for charging.

8. Apparatus according to claim 7, wherein call data records are sent to said home network for said charging.

9. Apparatus according to claim 1, further comprising an OCS relay to decide whether to charge said roaming device at the home network or at the local network.

10. Apparatus according to claim 9, wherein said decision to charge is based on a presence or absence of a subscription of the roaming device at the local network.

11. Apparatus according to claim 1, wherein a charging relay is provided at said local network for managing charging for said data, said charging relay being associated with said filter to send charges for said diverted data to said local network and to send charges for other data to said home network.

12. Apparatus according to claim 4, wherein said filter is contained in an MIP or a PMIP signaling relay.

13. Apparatus according to claim 4, wherein said packet diverter is further configured to detect when diverted packets return a no access error, to cease to divert packets corresponding to said no access error, and to re-send said corresponding packets to their original address.

14. Apparatus for local access to data while roaming with a mobile telephony device at a roaming network, the telephony device being associated with a home network separate from said roaming network, the apparatus being located at said roaming network and comprising:
  a filter having a data packet inspection unit for inspecting packets to identify data packets addressed from said roaming telephony device for use via a home network data packet gateway, and a packet diverter for diverting at least some of said identified packets to a local data packet gateway;
  said filter being further configured to set up a diversion tunnel for additional packets having packet destination information corresponding to said diverted packets, said diversion tunnel being for locally routing said packets having corresponding packet destination address information to said local data packet gateway, wherein said filter is contained in a GTP singling relay, wherein said networks are all-IP networks wherein data is channeled from said roaming mobile device to said relay via a serving gateway, and wherein a data packet gateway comprises a PDN gateway, said relay comprising an serving gateway/PDN gateway emulator, emulating a serving gateway towards the home network PDN gateway and a PDN gateway towards the roaming network serving gateway.

15. Apparatus according to claim 14, wherein said diverted packets are diverted towards a local breakout at a local PDN gateway alongside voice packets.

16. Method for providing local access to data while roaming with a mobile telephony device at a roaming network, the telephony device being associated with a home network separate from said roaming network, the method being carried out at an electronic processor on said roaming network and comprising:
  inspecting packets to identify data packets addressed from said roaming telephony device for use via a home network data packet gateway;
  diverting at least some of said identified packets to a local data packet gateway; and
  setting up a diversion tunnel for additional packets having packet information corresponding to said diverted packets, said diversion tunnel directly routing said packets having said corresponding packet information to said local data packet gateway, wherein said inspecting packets is carried out at a GTP signaling relay, data being channeled from said roaming mobile device for said inspecting via a serving GPRS support node—SGSN, wherein a data packet gateway comprises a GGSN— said relay comprising an SGSN/GGSN emulator, emulating an SGSN to the home network GGSN and a GGSN to the roaming network SGSN.

17. The method of claim 16, further comprising extracting said packets from a data tunnel to said home data packet gateway and creating a continuation of said data tunnel to said home data packet gateway alongside said diversion tunnel.

18. The method of claim 16, comprising:
  initially diverting packets as a default setting; and
  cancelling said diversion when ones of said diverted packets attract access refusals,
  and following said cancelling, sending said ones of said diverted packets to an original destination.

19. The method of claim 16, said home network providing a subscription data service accessible through a portal, the method comprising:
  selecting between packets addressed for said subscription data service and packets addressed outside of said subscription data service; and
  diverting only those packets addressed outside of said subscription data service.

20. The method of claim 19, comprising carrying out said selecting by examining layer 7 data of said packet to find a URL and determining whether said URL maps to a portal of said home network.

21. The method of claim 16, wherein said diverting comprises exchanging an address of the home data packet gateway or a name identifying the home gateway with an address of the local data packet gateway within an inspected header.

22. The method of claim 16, further comprising a packet return path for data packets to said roaming mobile device, the method comprising setting all packets in said packet return path of a respective roaming mobile user to a same IP address.

* * * * *